United States Patent [19]
Voss

[11] Patent Number: 5,462,076
[45] Date of Patent: Oct. 31, 1995

[54] PRESSURE-COMPENSATED PRESSURE LIMITING VALVE

[75] Inventor: Richard Voss, Schwerte, Germany

[73] Assignee: Richard Voss Grubenausbau GmbH, Schwerte, Germany

[21] Appl. No.: 311,884

[22] Filed: Sep. 26, 1994

[30]  Foreign Application Priority Data

Jun. 17, 1993 [DE] Germany ............... 43 19 967.4

[51] Int. Cl.⁶ .................................... F16K 15/06
[52] U.S. Cl. ............. 137/454.5; 137/536; 137/538
[58] Field of Search .................... 137/454.5, 494, 137/536, 538

[56]  References Cited

U.S. PATENT DOCUMENTS

| | | | |
|---|---|---|---|
| 2,333,522 | 11/1943 | Clifton | 137/491 |
| 2,625,174 | 1/1953 | Forde | 137/491 |
| 3,174,410 | 3/1965 | Booth | 137/491 X |
| 3,482,594 | 12/1969 | Simon | 137/538 |
| 3,613,716 | 10/1971 | Hoheisel | 137/491 |
| 4,135,541 | 1/1979 | Lorimor | 137/491 X |
| 4,284,101 | 8/1981 | Weirich | 137/538 |
| 4,530,373 | 7/1985 | Bork | 137/538 X |
| 4,597,410 | 7/1986 | Wilke | 137/491 |
| 4,716,928 | 1/1988 | Kussel | 137/538 X |
| 4,724,857 | 2/1988 | Taylor | 137/538 X |
| 4,727,902 | 3/1988 | Unterstein | 137/536 X |
| 5,168,895 | 12/1992 | Voss | 137/494 |

FOREIGN PATENT DOCUMENTS

| | | | |
|---|---|---|---|
| 226177 | 8/1962 | Austria | 137/538 |
| 1909338 | 7/1978 | Germany. | |
| 3314837 | 12/1983 | Germany. | |
| 8408072 | 11/1984 | Germany. | |
| 2830891 | 1/1986 | Germany. | |
| 3508986 | 6/1988 | Germany. | |
| 3922894 | 2/1991 | Germany. | |
| 3929094 | 4/1991 | Germany. | |
| 278330 | 11/1970 | U.S.S.R. | 137/538 |

OTHER PUBLICATIONS

Exner et al., Grundlagen und Komponenten der Fluidtechnik Hydraulik (The Foundation and Components of the Fluid Technology Hydraulics), Der Hidraulik Trainer, Band 1 pp. 216–217 (undated).

*Primary Examiner*—Robert G. Nilson
*Attorney, Agent, or Firm*—James Creighton Wray

[57]  ABSTRACT

Pressure limiting valves intended for use in underground mining and tunnel construction are able to release the pressure medium discharged if an overload occurs without problems into the return line, since the occurring back pressure is directly neutralized in the pressure limiting valve. For this purpose a discharge of the pressure medium is provided even before the spring chamber, for which purpose the crossbores arranged there are constructed in such a way that they expand, forming a water chamber with increased volume. This water chamber is located in ring form around the valve piston that is exposed in this area and is connected via return bores to the return line. The water chamber with accordingly large volume makes it possible that the back pressure acts simultaneously on the spring and the valve piston, so that the described neutralization takes place.

22 Claims, 2 Drawing Sheets

PRESSURE-COMPENSATED PRESSURE LIMITING VALVE

BACKGROUND OF THE INVENTION

The invention relates to a pressure limiting valve for hydraulic support in underground mining and tunnel construction, with a tubular valve housing, the valve case that is movable in the guide against the force of the valve spring arranged and adjustable inside the valve housing, and the crossbores constructed in the valve housing or guide in front of the spring chamber, with the pressure medium being able to spray off through these crossbores when the valve responds, while bypassing the spring chamber.

Such pressure limiting valves are known from DE-OS 35 08 986.5–12. These known pressure limiting valves are used to protect underground support from overloads. Such overloads occur especially if the support is compressed due to convergence, causing the pressure in the individual props to rise. To avoid an overload in this case, part of the pressure fluid in the props is exactly discharged by the pressure limiting valves when a critical pressure of, e.g., above 400 bar is present. For this purpose, the pressure limiting valves are equipped with a valve spring that is arranged in the valve housing between the spring plate set onto the valve piston on the one side and the adjustment screw on the other side. If an overload occurs, the valve spring is then compressed by the valve piston and spring plate, so that the valve piston moves in the valve bore and is able to drive over an O-ring in the process, so that the pressure medium is then able to flow outward from the prop through the pressure limiting valve. To enable this flowing-off, the known valve has a bore in the adjustment screw or in the top part of the valve housing, resulting in an advantageous upward thrust effect that significantly increases the response accuracy of the valve. The spring itself is adjusted by turning the adjustment screw so that the valve accordingly opens at the predefined pressure. Regulations concerning operating and environmental protection reasons in underground mining and tunnel construction for such pressure limiting valves require that the discharged pressure medium must be collected and returned via a return line into the system. The pressure present in this return line and the pressure occurring during the flowing through the valve housing influence the adjustment force of the spring, so that an exact setting of the opening point is difficult.

DE-GM 84 08 072 introduces a pressure limiting valve where the spring chamber is kept dry by an extended guide in which crossbores are constructed, said crossbores extending in front of the spring chamber at a right angle to the valve bore and removing the pressure medium when the valve responds, while bypassing the spring chamber. The valve piston is divided into two pans, whereby the bottom valve piston has a smaller diameter than the top part of the valve piston that has no bores. Because of this, the two pans of the valve piston can be moved inside the valve bore when an overload occurs, whereby the pressure medium can be discharged through the crossbores in the area of the bottom piston part after the O-ring has been passed. When connecting a return line to the crossbores, but even without them, a back pressure would be generated during the spraying off of the pressure medium in this valve also, whereby this back pressure changes the set valve force to such an extent that the valve is no longer able to respond accurately.

SUMMARY OF THE INVENTION

The invention therefore is based on the task of proposing a pressure limiting valve that operates and is adjustable independently from the back pressure.

According to the invention, this task is solved in that the crossbores are constructed so as to expand into a water chamber with increased volume, that the water chamber extends in ring form around the valve piston that is exposed in this area, and that return bores leading from the water chamber to the exterior mantle that are equipped with sealing rings in a manner enabling a water-tight connection of the return line are provided.

In pressure limiting valves constructed in this manner, the valve spring can be adjusted accurately to the hydraulic pressure, e.g. 400 bar, at which the pressure limiting valve is supposed to open. If during the discharge of the pressure medium a back pressure is generated in the water chamber, it is neutralized automatically, because the same force (back pressure) acts on the spring and on the piston. Because of this neutralized back pressure, the valve spring can be permanently set accurately while preventing the occurrence of errors or problems. Back pressure occurring both in the area of the water chamber and the adjoining return bores is, as mentioned, harmless, whereby the discharged pressure medium can be removed through the water-tight connection of the return line in an environmentally neutral manner.

According to a useful design it is provided that the valve piston consists of the main piston, which has a blind bore and radial bores and drives over an O-ring, and a spring piston with no bores that is inserted on the head side into the spring plate, said spring piston being disposed in the valve bore above the water chamber so as to drive over a second sealing ring. This design has not only advantages related to production, because existing components, such as the main piston, can be used, but also guarantees the compensation of the back pressure in the area of the water chamber. A one-part construction of the valve piston is certainly conceivable, but the described construction also simultaneously creates a type of "application surface" for the back pressure.

To effectively neutralize the back pressure in the area of the water chamber or through the water chamber, the invention provides that main piston and spring piston have the same diameter. If the two-part design of the valve piston is desired or implemented as a practical form, uniform action on the spring and valve piston is only ensured if main piston and spring piston are sized accordingly.

A material with a hardness of up to 90 Shore A is commonly used for the sealing rings or O-rings in the area of the valve piston. According to the invention it is provided that in the case of the two-part design, the hardness of the O-ring is 92 to 94 Shore A and that of the sealing ring is below 90 Shore A. Hereby this variation has the great advantage that the seal in the area of the spring piston is realized by way of a "soft" sealing ring, while the O-ring, which is passed by the pressure medium, has an accordingly greater hardness. This greater hardness results in better service lives and simultaneously ensures an effective seal even in the case of the high pressures necessary here.

The special design of the O-ring also makes it possible that the radial bores of the main piston that is disposed so as to drive over the O-ring has the same or larger diameter than the O-ring. Because of the greater hardness, an excessive load on the O-ring must not be anticipated here, so that the appropriate selection of the diameters of the radial bores ensures that a greater volume of pressure medium can be discharged, and can be discharged in a timely manner.

It is necessary that a sufficiently large collection chamber for pressure compensation is provided, thereby the invention provides that the water chamber has two to five times, preferably three times, the cross-section of the return bores. The back pressure generated in the water chamber is hereby neutralized advantageously, so that, as already mentioned, a negative change in the area of the valve spring or valve piston cannot become effective. The same force of the back pressure acts on the valve spring on one side and on the valve piston on the other side.

A useful design of the invention provides that the return bores are constructed so as to extend, starting at the water chamber, axis-parallel to the valve bore in the guide and at a distance to the valve bore or the latter's exit/entrance. In this way the pressure medium that flows off or is sprayed off can be collected via the return line and can be introduced effectively into the return line by way of several different conceivable solutions. Since the valve bore and the return bores are disposed at a distance to each other, it is possible by way of skilled arrangement, e.g. in a block, to create the necessary connection possibilities for the return line or the control line of the pressure limiting valve or the supply line of the consumer.

According to another possibility, it is provided that the return bores are constructed so as to radially adjoin the water chamber and to lead towards the exterior mantle. Although this design requires special seals in the area of the exterior mantle of the pressure limiting valve, it does have the advantage that the pressure medium is able to flow off in the area of the pressure limiting valve into the return line without further bypassing. The necessary connection of the return line is here also created e.g. by way of a block, with the stipulation that the pressure limiting valve here must be inserted accordingly further, whereby on both sides of the four radially extending return bores that have been provided the sealing rings are disposed in grooves constructed in the exterior mantle. These seals ensure the necessary seal, so that the pressure medium can be supplied to the return line via the crossbores and the enclosing block. An additional back pressure is hereby unable to have any effect.

The return bores adjoining the water chamber radially may be sized so that four will be sufficient to safely discharge the exiting pressure medium volume. Since the return bores extending axis-parallel to the valve bore must be constructed in the mantle of the guide, it is useful to work with smaller diameters, something which is made possible by the fact that 6 to 8 return bores are constructed axis-parallel to the valve bore at a distance in the guide. Hereby a sealing ring that safely ensures the effective sealing and safe discharge of the pressure medium in the direction of the return line is provided at the end side of the guide.

In the case of all of these pressure limiting valves, the inventor has ensured that they use identical basic form or basic parts, if possible, and that they do not represent excess expenditures in production. These preconditions are fulfilled by this invention especially if the guide is constructed in two parts, whereby the top part holding the spring piston can be screwed into the valve sleeve, and the bottom part holding the main piston can be screwed into the top part, and the water chamber is constructed as a recess in the bottom of the top part. In this way a type of modular system can be realized, which possibly will even permit use of a one-part valve piston, in which case simply one of the parts of the guide is eliminated or the guide is constructed in one part. It is especially advantageous in the invention that the water chamber has a correspondingly large volume as was already discussed above, for which purpose the top part is simply shaped accordingly. The individual parts, i.e., top part and bottom part, are screwed to each other and to the valve housing, so that a fast and accurate installation is ensured.

The invention is particularly characterized in that a pressure limiting valve has been proposed that represents a pressure limiting valve that always responds accurately independent from the back pressure that occurs and independent from the return line provided in this case. The back pressure is neutralized, i.e., by the design of the water chamber and the design of the return bores, so that a pressure-compensated pressure limiting valve or a pressure limiting valve that acts independently from the back pressure is realized.

The valve spring can be adjusted accurately to the hydraulic pressure, e.g. 400 bar, while preventing that a disadvantageous back pressure becomes active during opening. Rather, the back pressure that has developed is neutralized and thus made harmless.

Other advantages are realized through the design of the O-rings or sealing rings that are adjusted exactly to the respective application, so that not only high service lives but also advantageous seals are always ensured. A pressure limiting valve suitable for underground use is thus accordingly designed with a guide return or a water chamber return.

Other details and advantages of the subject of the invention result from the following description of the corresponding drawings that illustrate preferred embodiments with the necessary details and individual parts. In the drawing:

DETAILED DESCRIPTION OF THE DRAWINGS

Figure 1:
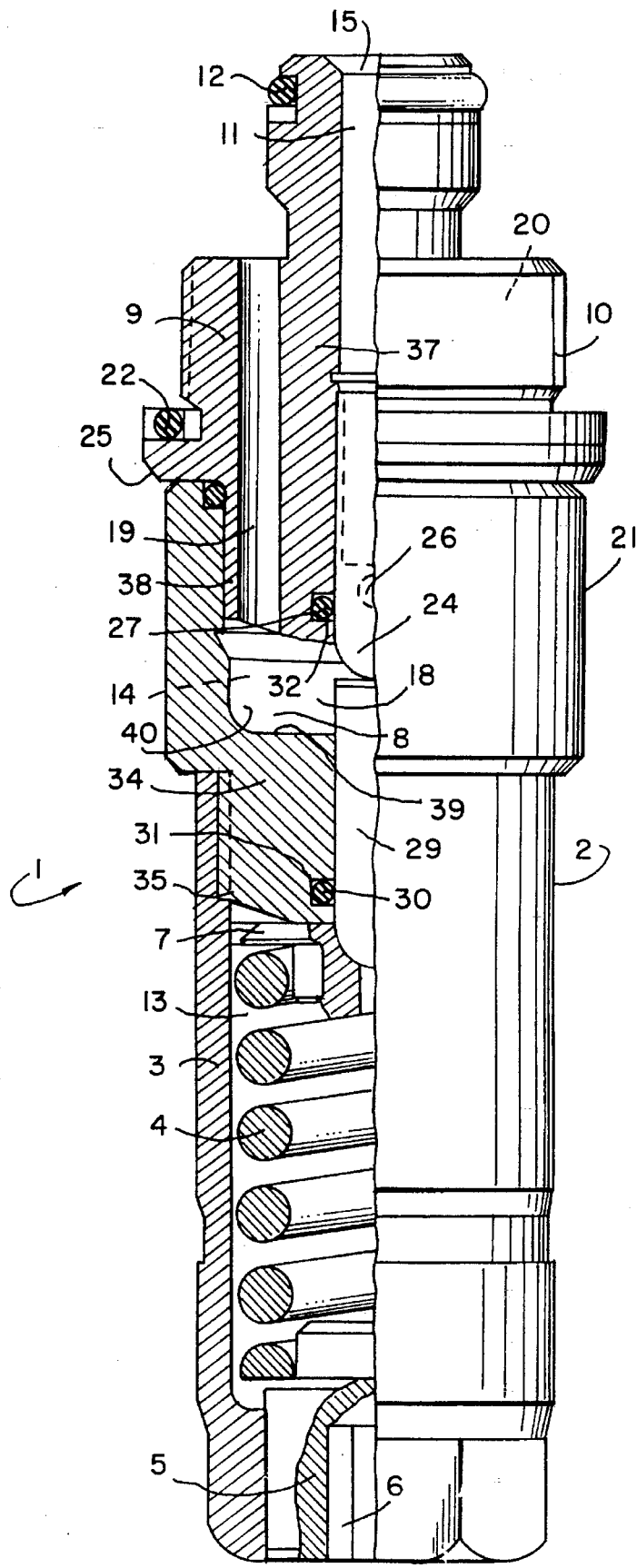
FIG. 1 shows a pressure limiting valve with guide return.

The pressure limiting valve 1 shown in FIG. 1 is a so-called O-ring valve that is used primarily in underground mining for securing the hydraulic support (not shown here) used to keep open the hollow chambers created by mining.

The pressure limiting valve 1 comprises a valve housing 2 that consists both of the valve sleeve 3 holding the valve spring 4, and the guide 9 that is screwed into the valve sleeve 3.

The valve spring 3 that is supported on one side on adjustment screw 5 and on the other side on the spring plate 7 can be adjusted with the help of the hexagon socket screw 6 so that an opening pressure of e.g. exactly 400 bar is ensured.

The valve spring 4 is supported via spring plate 7 on the valve piston 8 that is positioned in the valve bore 11 inside the guide 9 so as to be able to move against the pressure of valve spring 4.

The valve piston 8 is equipped with radial bores and a blind bore that projects into the valve bore 11 or is connected to it.

Figure 2:
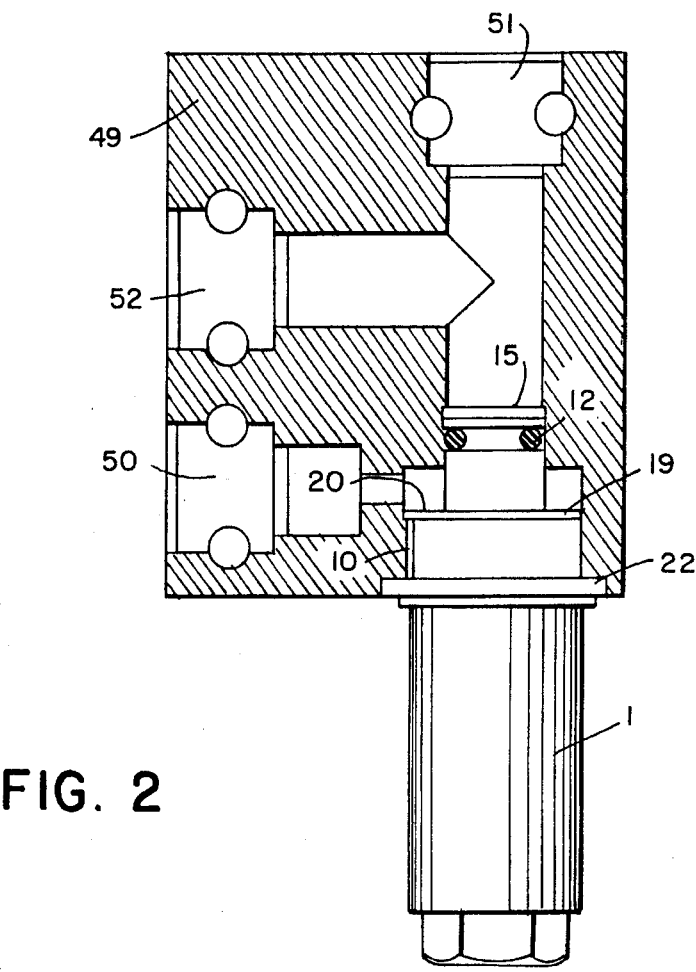
FIG. 2 shows the pressure limiting valve shown in FIG. 1 with connection block.

The guide 9 has a connection thread 10 so that it can be screwed e.g. into the block shown in FIG. 2. The sealing ring 12 hereby ensures that the valve bore 11 or its exit/entrance 15 can be sealed against other bores arranged in the guide 9. This is described in more detail below.

In the pressure limiting valve shown in FIG. 1, the spring chamber 13 that holds the valve spring 4 is kept dry. This is accomplished by removing the discharged pressure medium via crossbores 14 arranged at a distance in front of the spring chamber 13.

In the designs illustrated in FIG. 1 and in the other figures, the crossbores 14 are designed so that they expand, forming a water chamber that is connected via return bores 19,20 to the exterior. In FIG. 1, the return bores 19,20 do not end in the direct area of exterior mantle 21, but rather, as FIGS. 1 and 2 show, end in the direction of the exit/entrance 15 of the valve bore 11, i.e., at a distance to the latter, so that a separate supply or connection 50 is possible. The sealing ring 22 hereby ensures that the return bores (19,20) also are sealed effectively in the entrance area into the block that is however not shown here but rather in FIG. 2.

Figure 3:
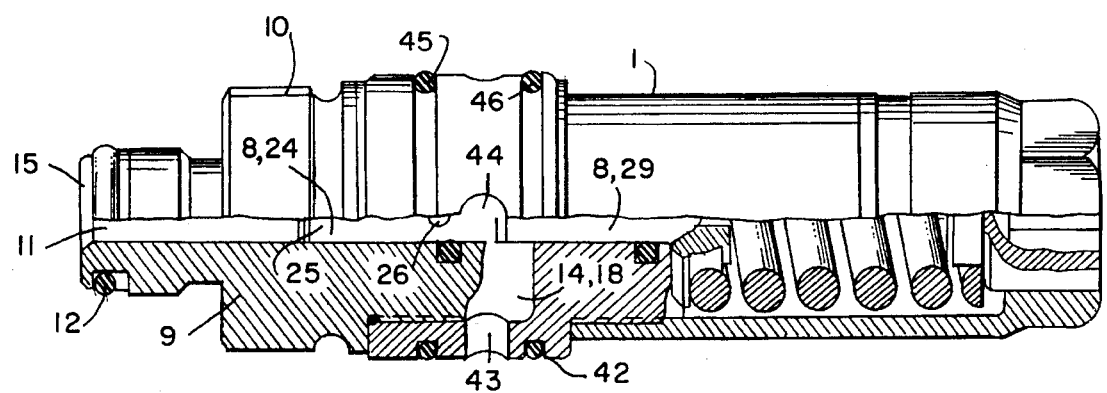
FIG. 3 shows a pressure limiting valve with water chamber return.

In the design shown in FIG. 1 and in the design shown in FIG. 3, the valve piston 8 consists of the main piston 24 that has a blind bore 25 and radial bores 26 and is sealed by an O-ring 27, and a spring piston 29 that itself must be sealed effectively by a sealing ring 30 when it is moved towards the spring plate 7. If, e.g. as a result of convergence, a pressure above 400 bar occurs and is passed via valve bore 11 to the valve piston 8 or main piston 24, the valve opens. This opening of the pressure limiting valve 1 is accomplished by sliding the main piston 24 over the O-ring 27, so that the pressure medium can be discharged via blind bore 25 and radial bores 26 into the water chamber 18.

The valve piston 8 is made of two pistons: the main piston 24 and the spring piston 29. Any back pressure in chamber 18 will act with the same intensity on both the spring piston 29 and the main piston 24, as shown in FIG. 1.

The O-ring 27 is located in groove 32, while the sealing ring 30 is located in groove 31 and thus can be driven over easily by the individual parts of valve piston 8.

It is clear that the cross-section of the water chamber 18 is much larger than the cross-section of the return bores 19,20.

The compensation of the back pressure, or its neutralization, ensures an accurate response of the pressure limiting valve and an always uniform discharge of the pressure medium; a pressure-compensated pressure limiting valve has been created.

In the design shown in FIG. 1, but also in the one shown in FIG. 3, the guide 9 consists of two parts, i.e., the top part 34 that is screwed via thread 35 into the valve sleeve 3, and the bottom part 37 that is screwed via thread 38 into the top part 34. It is obvious that thread 35 and thread 38 each have corresponding counterthreads in the receiving parts. A recess 40 is provided in the bottom 39 of the top part, so that a water chamber 18 with a large volume is created almost naturally. It is obvious that the return bores 19,20 hereby are constructed simply in the bottom part 37, so that a practical and safe production of these individual parts can be ensured.

It has already been pointed out before that the valve piston 8 consists of the main piston 24 and the spring piston 29, whereby both are constructed so as to drive over an O-ring 27 or a sealing ring 30. The hardness of the two rings 27, 30 is different. According to the specification of the invention, the O-ring 27 has a hardness of 92 to 94 Shore A, and the sealing ring 30 has a hardness below 90 Shore A, or the rings consist of an appropriate material, so that especially the O-ring that is subject to higher loads permits long service lives but also ensures that the radial bores 26 may have a distinctly larger diameter than the sealing ring or the O-ring 27 itself. In this way, large flow volumes can be achieved.

FIG. 2 shows a valve block 49 into which the pressure limiting valve 1 has been inserted. This is accomplished by screwing it in by way of the connection thread 10. The return bores 19,20 that are only suggested here are sealed by the sealing ring 22, while sealing ring 12 seals the exit/entrance 15 of the valve bore 11. The block 49 has a bore intended for the connection of a return line 50, so that the pressure medium flowing from the return bores 19,20 can be removed. Return line 50 or the corresponding connection in block 49 is constructed as a snap-on connector. The pressure limiting valve receives the control pressure via control line 51, whereby there is no influence on, e.g., the return line, since this bore is blocked via seal 12. The control line 51 is connected to the supply line 52 via the bore constructed in block 49.

FIG. 3 finally represents a variation of the pressure limiting valve of the invention, in as far as the return bores here are not arranged axis-parallel to valve bore 11 but rather are arranged radially to it and accordingly have been designed with reference numbers 43,44 in order to point out this difference. For this reason, the pressure limiting valve shown in FIG. 3 also can be designated as a pressure limiting valve with water chamber return. This radial arrangement of return bores 43,44 has the advantage that no further deflection of the pressure medium stream is required.

In this design, appropriate sealing possibilities must be separately created in the exterior mantle 21, which, as shown in FIG. 3, is realized by way of sealing rings 42,45 that are arranged on both sides of the exit openings of the return bores 43,44. They are located in grooves 46 and thus are arranged safely so that the entire pressure limiting valve 1 can be inserted appropriately far into a block that is not shown here.

For the remainder, the pressure limiting valve according to FIG. 3 functions similarly or exactly as the one shown in FIG. 1, with the exception that the return bores 43,44, as mentioned, are constructed differently than return bores 19,20.

All features that have been mentioned, including those solely found in the drawings, are considered to be essential to the invention both alone and in combination.

I claim:

1. Pressure limiting valve for hydraulic support in underground mining and tunnel construction, comprising a tubular valve housing, a valve piston that is movable in a guide against force of a valve spring arranged and adjustable inside a spring chamber connected to the valve housing, and a water chamber constructed in the valve housing in front of the spring chamber for spraying off pressure medium through the water chamber when the valve piston responds, while bypassing the spring chamber, the water chamber extending in ring form around the valve piston that is exposed in this area, water chamber return bores leading from the water chamber to an exterior mantle and sealing rings for enabling a water-tight connection of a return line.

2. Pressure limiting valve for hydraulic support in underground mining and tunnel construction, comprising a tubular valve housing, a valve piston that is movable in a guide against force of a valve spring arranged and adjustable inside a spring chamber connected to the valve housing, and a water chamber constructed in the valve housing in front of the spring chamber for spraying off pressure medium through the water chamber when the valve piston responds, while bypassing the spring chamber, the water chamber extending in ring form around the valve piston that is exposed in this area, water chamber return bores leading from the water chamber to an exterior mantle and sealing rings for enabling a water-tight connection of a return line, wherein the valve piston comprises a main piston which has a blind bore, radial bores and a spring piston with no bores that is inserted on a head side into a spring plate, said spring piston being disposed in a valve bore between the spring chamber and the water chamber, a sealing ring between the spring piston and the valve bore and an O-ring between the main piston and the guide.

3. The pressure limiting valve according to claim 2, wherein the main piston and the spring piston have the same diameter.

4. The pressure limiting valve according to claim 2, wherein hardness of the O-ring is 92 to 94 Shore A and hardness of the sealing ring is below 90 Shore A.

5. The pressure limiting valve according to claim 2, wherein the radial bores from the main bore that move over the O-ring have the same or larger diameter than the O-ring.

6. The pressure limiting valve according to claim 2, wherein the water chamber has two to five times, preferably three times, the cross-section of the return bores.

7. The pressure limiting valve according to claim 2, wherein the return bores are constructed so as to extend, starting at the water chamber in the guide parallel to the valve bore.

8. The pressure limiting valve according to claim 2, wherein six to eight return bores are constructed in the guide parallel to the valve bore.

9. The pressure limiting valve according to claim 2, wherein the return bores are constructed so as to radially extend from the water chamber to the exterior mantle.

10. The pressure limiting valve according to claim 9, wherein sealing rings are disposed in grooves constructed in the exterior mantle on both sides of ends of the radially extending return bores.

11. The pressure limiting valve according to claim 2, wherein the guide is constructed in two parts, whereby an outer part holding the spring piston is screwed into a valve sleeve and an inner part holding the main piston is screwed into the outer part, and the water chamber being constructed as a recess in a bottom of the outer part.

12. A pressure limiting valve for hydraulic supports in underground mining and tunnel construction comprising a tubular valve housing, a spring chamber mounted in the housing, a valve spring adjustably mounted in the spring chamber, a valve piston mounted in the housing, said valve piston being movable in response to fluid pressure, a water chamber formed in the valve housing in front of the spring chamber for spraying off a pressure medium and bypassing the spring chamber in response to a movement of the valve, the water chamber being coaxial with the valve piston and surrounding the valve piston, and wherein the valve piston is exposed in an area of the water 13. A pressure limiting valve for hydraulic supports in underground mining and tunnel construction comprising a tubular valve housing, a spring chamber mounted in the housing, a valve spring adjustably mounted in the spring chamber, a valve piston mounted in the housing, said valve piston being movable in response to fluid pressure, a water chamber formed in the valve housing in front of the spring chamber for spraying off a pressure medium and bypassing the spring chamber in response to a movement of the valve, the water chamber being coaxial with the valve piston and surrounding the valve piston, and wherein the valve piston is exposed in an area of the water chamber, and plural return bores extending from the water chamber, ends of the plural return bores being surrounded by sealing rings for forming a connection with a return line connected to the return bores, wherein the valve piston comprises a main piston and a spring piston, the main piston having a blind bore and plural radial bores, the main piston and the radial bores being driven over an O-ring by excess pressure in the blind bore for communicating the excess pressure from the blind bore through the radial bores to the water chamber, the spring piston abutting a spring plate on one end of the spring within the valve housing, the spring piston being mounted within a valve bore above the water chamber and spring chamber and being sealed by a sealing ring in the valve bore. chamber, and plural return bores extending from the water chamber, ends of the plural return bores being surrounded by sealing rings for forming a connection with a return line connected to the return bores.

14. The pressure limiting valve of claim 13, wherein the main piston and the spring piston are of equal diameters.

15. The pressure limiting valve of claim 13, wherein the O-ring has an hardness between 92 and 94 Shore A and the sealing ring has an hardness of less than 90 Shore A.

16. The pressure limiting valve of claim 13, wherein the radial bores of the main piston have diameters equal to or larger than a diameter of the O-ring.

17. The pressure limiting valve of claim 13, wherein the water chamber has a cross-section at least between two to five times a cross-section of the return bores.

18. The pressure limiting valve of claim 13, further comprising a guide, and wherein the return bores extend from the water chamber parallel to an axis of the valve bore within the guide and are spaced away from the valve bore.

19. The pressure limiting valve of claim 18, further wherein the return bores comprise between six to eight return bores formed within the guide parallel to the valve bore.

20. The pressure limiting valve of claim 13, wherein the return bores radially adjoin the water chamber and lead radially outward towards the exterior mantle.

21. The pressure limiting valve of claim 20, wherein the return bores have first and second sides and on each of the sides are provided sealing rings, sealing rings are positioned within respective plural grooves formed in the exterior mantle, and wherein the return bores terminate outwardly between the sealing rings.

22. The pressure limiting valve of claim 3, further wherein the guide comprises first and second parts, the first part forming an outer portion for holding the spring piston and for being threadably attached in a valve sleeve, and the second part forming an inner portion for holding the main piston and for being threadably attached to the outer portion, and further wherein the water chamber is formed as a recess in a lower end of the outer portion.

* * * * *